United States Patent

Mosko

(10) Patent No.: US 8,457,124 B2
(45) Date of Patent: Jun. 4, 2013

(54) TDMA COMMUNICATION USING A CSMA CHIPSET

(75) Inventor: Marc E. Mosko, Santa Cruz, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 420 days.

(21) Appl. No.: 12/852,204

(22) Filed: Aug. 6, 2010

(65) Prior Publication Data

US 2012/0033684 A1 Feb. 9, 2012

(51) Int. Cl.
*H04L 12/56* (2006.01)

(52) U.S. Cl.
USPC ............................ 370/389; 370/392; 370/474

(58) Field of Classification Search
None
See application file for complete search history.

(56) References Cited

U.S. PATENT DOCUMENTS

| 7,313,104 | B1 * | 12/2007 | Kern et al. | 370/310 |
| 7,864,678 | B1 * | 1/2011 | Sampath et al. | 370/232 |
| 2006/0056442 | A1 * | 3/2006 | DaCosta et al. | 370/458 |
| 2007/0153745 | A1 * | 7/2007 | Sun et al. | 370/335 |
| 2009/0046711 | A1 * | 2/2009 | Poikela | 370/389 |
| 2010/0014437 | A1 * | 1/2010 | Wang et al. | 370/252 |

OTHER PUBLICATIONS

Snow, et al; "Implementing a Low Power TDMA Protocol Over 802.11"; IEEE Communications Society; 2005; pp. 75-80.*
Sharma, et al; "MadMAC: Building a Reconfigurable Radio Testbed using Commodity 802.11 Hardware"; in IEEE SECON SDR, 2006, pp. 1-6.*
Patra, et al; "WiLDNet: Design and Implementation of High Performance WiFi Based Long Distance Networks"; NSDI, 2007; pp. 1-14.*
Boggia, et al; "An Experimental Evaluation on Using TDMA over 802.11 MAC for Wireless Networked Control Systems"; IEEE; 2008, pp. 1157-1160.*
Raman, et al; "Design and Evaluation of a new MAC Protocol for Long-Distance 802.11 Mesh Networks"; MobiCom '05, Sep. 2005; pp. 1-14.*
Sharma, et al; "FreeMAC: Framework for Multi-Channel MAC Development on 802.11 Hardware"; PRESTO '08; Aug. 2008; pp. 69-74.*
Dhekne, et al; "Implementation and Evaluation of a TDMA MAC for WiFi-based Rural Mesh Networks", ACM; 2009, pp. 1-6.*
Guo, et al; "Software TDMA for VoIP Applications over IEEE802.11 Wireless LAN", IEEE; 2007, pp. 2366-2370.*

* cited by examiner

*Primary Examiner* — Robert Scheibel
(74) *Attorney, Agent, or Firm* — Shun Yao; Park, Vaughan, Fleming & Dowler LLP

(57) ABSTRACT

A technique for communicating information using an electronic device that includes an IEEE 802.11-compliant chipset is described. This communication technique facilitates transmission of data packets in IEEE 802.11 frames in a communication channel by the IEEE 802.11-compliant chipset using time division multiple access (TDMA). In particular, the electronic device may queue a data packet in a software queue. Based on available space in a hardware queue in the IEEE 802.11-compliant chipset, this data packet may be provided to the hardware queue for inclusion in an IEEE 802.11 frame that is compliant with an IEEE 802.11 communication protocol. Then, the electronic device provides time-slot control information to the IEEE 802.11-compliant chipset based on a timing-synchronization signal. In this way, the electronic device gates the release of the data packet from the hardware queue for transmission in the IEEE 802.11 frame by the IEEE 802.11-compliant chipset.

18 Claims, 5 Drawing Sheets

TDMA COMMUNICATION USING A CSMA CHIPSET

BACKGROUND

1. Field

The present disclosure relates to techniques for communicating information. More specifically, the present disclosure relates to techniques for communicating data packets in a communication channel by a carrier sense multiple access (CSMA)-based chipset using time division multiple access (TDMA).

2. Related Art

Networks that use carrier sense multiple access (CSMA) with contention avoidance-protocol (such as IEEE 802.11) typically have poor performance for real-time traffic, for example, with voice-over-Internet-protocol (VoIP) or video data streams. This performance problem can be pronounced when there is high contention for the communication channel in the network or when some of the terminals or nodes in the network are hidden from the remaining nodes and the carrier-sense mechanism in CSMA fails.

One technique for solving the performance problem is to communicate information in the network using time division multiple access (TDMA). However, the high cost of developing such a chipset can be prohibitive.

Hence, what is needed is a method and an electronic device that facilitates TDMA communication with a CSMA chipset without the problems listed above.

SUMMARY

The disclosed embodiments relate to a method for communicating information that is performed by an electronic device that includes an IEEE 802.11-compliant chipset. During operation, the electronic device queues a data packet in a software queue. Then, the electronic device provides the data packet to a hardware queue in the IEEE 802.11-compliant chipset for inclusion in an IEEE 802.11 frame. Note that the data packet is provided based on available space in the hardware queue, and that the IEEE 802.11 frame is compliant with an IEEE 802.11 communication protocol. Next, the electronic device provides time-slot control information to the IEEE 802.11-compliant chipset based on a timing-synchronization signal, thereby gating the release of the data packet from the hardware queue for transmission in the IEEE 802.11 frame in a communication channel by the IEEE 802.11-compliant chipset using time division multiple access (TDMA).

In some embodiments, the time-slot control information includes a count value for a timer in the IEEE 802.11-compliant chipset. Alternatively, the time-slot control information may include a timing signal generated by a timer in software.

Furthermore, the electronic device may: disable a contention-avoidance feature in the IEEE 802.11-compliant chipset; and/or configure the IEEE 802.11-compliant chipset to release one data packet at a time from the hardware queue.

Note that providing the data packet to the hardware queue may involve an asynchronous operation. Additionally, gating the hardware queue may involve writing a value to a hardware port in the IEEE 802.11-compliant chipset.

A variety of techniques may be used to ensure time synchronization among electronic devices (including the electronic device) that communicate via the communication channel using TDMA. In some embodiments, the electronic device communicates timing-synchronization information associated with the timing-synchronization signal to another IEEE 802.11-compliant chipset in a communication system using in-band communication in the communication channel. For example, the timing-synchronization information may be provided to the IEEE 802.11-compliant chipset for inclusion in a standard header field in the IEEE 802.11 frame that includes the data packet. In this way, the time-slot synchronization information may facilitate common timing of the communication channel using TDMA. However, in other embodiments, the electronic devices may receive the timing-synchronization signal from an external source using out-of-band communication.

In some embodiments, the electronic device queues multiple data packets in multiple software queues, and maps software queues to hardware queues. Then, the electronic device provides the data packets to the hardware queues in the IEEE 802.11-compliant chipset for inclusion in IEEE 802.11 frames. Note that the data packets are provided based on available space in the hardware queues, and the IEEE 802.11 frames are compliant with the IEEE 802.11 communication protocol. Next, the electronic device provides additional time-slot control information to the IEEE 802.11-compliant chipset based on the timing-synchronization signal to gate the release of the data packets from the hardware queues for transmission by the IEEE 802.11-compliant chipset in the communication channel using TDMA.

Moreover, a subset of the data packets may be included in a given IEEE 802.11 frame and/or a given time slot may include multiple mini time slots that include an associated subset of the data packets.

Note that the number of software queues and the number of hardware queues are selected based on a timing error associated with the gating and utilization of the communication channel. Additionally, the hardware queues may be associated with different communication priorities and/or the data packets may be provided from the software queues to the hardware queues based on a packet scheduler, which performs the mapping.

In some embodiments, a given hardware queue is associated with a given data-packet transmission time of a subset of the data packets for a given data rate in the communication channel, thereby facilitating inclusion of the data packets within a bounded time duration of assigned time slots. Furthermore, a sequence of data packets in a data stream, which have different data-packet transmission times, may be assigned to one of the hardware queues that can accommodate a largest data-packet transmission time in the different data-packet transmission times.

Another embodiment provides the electronic device.

Another embodiment provides a computer-program product for use with the electronic device. This computer-program product includes instructions for at least some of the operations performed by the electronic device.

Figure 1:
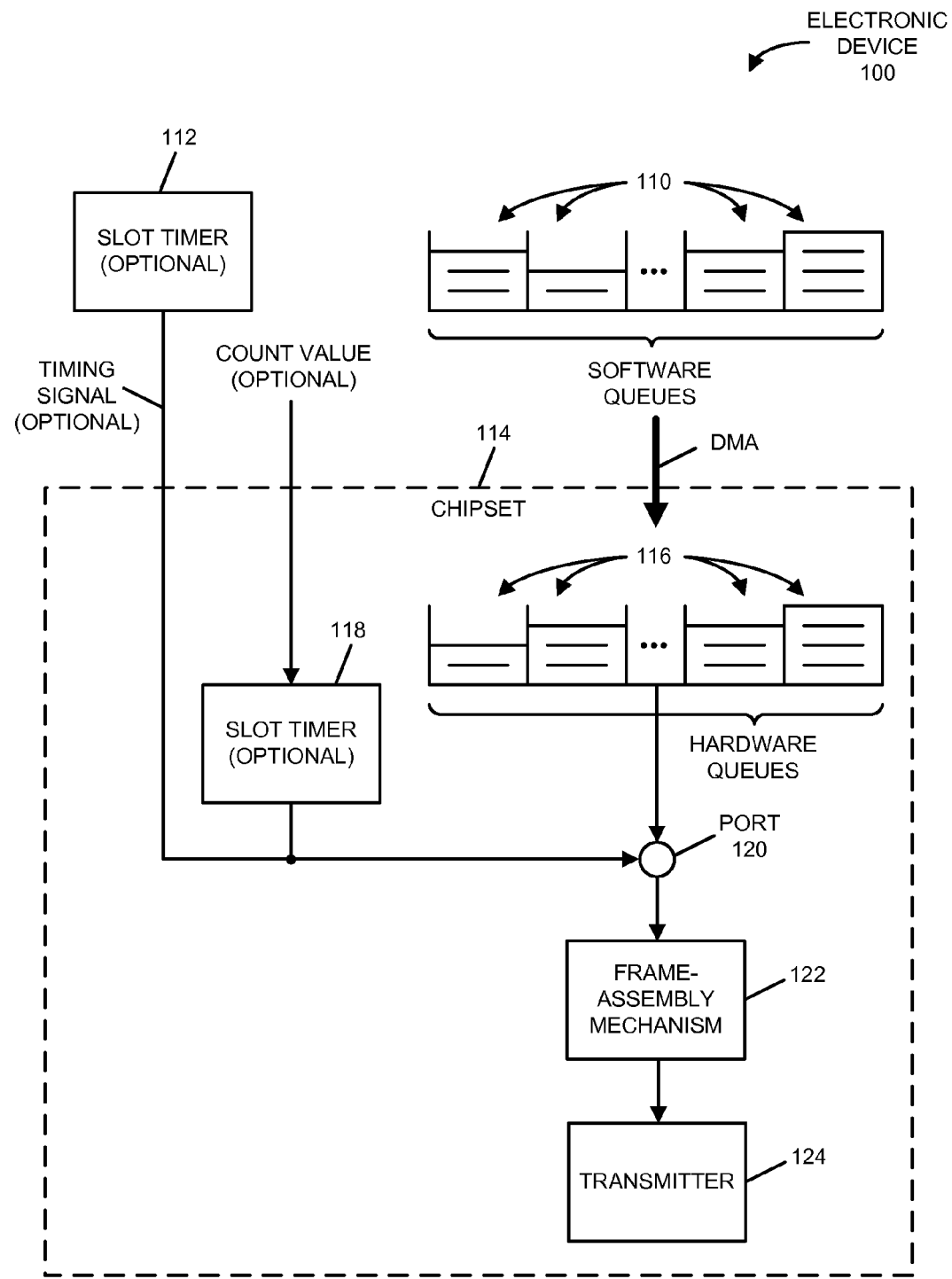
FIG. 1 is a block diagram of an electronic device that includes an IEEE 802.11-compliant chipset in accordance with an embodiment of the present disclosure.

Table 1 provides possible data-packet combinations in a time slot in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an electronic device that includes an IEEE 802.11-compliant chipset, a method for communicating information using the electronic device, and a computer-program product (e.g., software) that includes instructions for operations in the method are described. This communication technique facilitates transmission of data packets in IEEE 802.11 frames in a communication channel by the IEEE 802.11-compliant chipset using time division multiple access (TDMA). In particular, the electronic device may queue a data packet in a software queue. Based on available space in a hardware queue in the IEEE 802.11-compliant chipset, this data packet may be provided to the hardware queue for inclusion in an IEEE 802.11 frame that is compliant with an IEEE 802.11 communication protocol. Then, the electronic device provides time-slot control information to the IEEE 802.11-compliant chipset based on a timing-synchronization signal. In this way, the electronic device gates the release of the data packet from the hardware queue for transmission in the IEEE 802.11 frame by the IEEE 802.11-compliant chipset.

By facilitating the use of the IEEE 802.11-compliant chipset to communicate the data packets in IEEE 802.11 frames in the communication channel using TDMA, this communication technique may eliminate the need to develop and manufacture a separate TDMA chipset. Consequently, this communication technique may solve the problem of the high cost of entry in the market by enabling a low-cost solution based on a commercially available chipset. In the process, the communication technique may provide the advantages of TDMA communication in networks that use an IEEE 802.11 communication protocol, including close to 80% bandwidth efficiency.

In the discussion that follows, the IEEE 802.11-compliant chipset, an IEEE 802.11 frame format and the IEEE 802.11 communication protocol are used as illustrations of the communication technique. More generally, in other embodiments the communication technique may be used with other chipsets, frame formats and communication protocols, including other carrier sense multiple access (CSMA) communication protocols.

We now discuss embodiments of the electronic device. FIG. 1 presents a block diagram of an electronic device 100 that includes an IEEE 802.11-compliant chipset 114. In this electronic device, a data packet is queued in a software queue, such as one of software queues 110. Then, this data packet is provided to one of hardware queues 116 based on available buffer space in the hardware queue (for example, using a packet scheduler that determines a mapping from software queues 110 to hardware queues 116) for subsequent inclusion in an IEEE 802.11 frame that is compliant with an IEEE 802.11 communication protocol (such as IEEE 802.11a or IEEE 802.11n). For example, the data packet may be transferred to the hardware queue using an asynchronous operation, such as a direct memory access (DMA).

More generally, electronic device 100 may queue multiple data packets in multiple software queues 110, and the packet scheduler may map software queues 110 to hardware queues 116. Furthermore, electronic device 100 may provide the data packets to hardware queues 116 based on available buffer space in hardware queues 116 for subsequent inclusion in IEEE 802.11 frames.

Next, electronic device 100 provides time-slot control information to chipset 114 based on the timing-synchronization signal to gate the release of a corresponding data packet from one of hardware queues 116 for transmission by chipset 114 in the IEEE 802.11 frame in a communication channel using TDMA. In this way, electronic device 100 gates the release of the data packet from hardware queues 116 and facilitates TDMA communication.

Note that in some embodiments the time-slot control information includes a timing signal that is provided by optional slot timer 112, which may be implemented in hardware or software in electronic device 100. However, in other embodiments the time-slot control information includes a count value that is provided to optional slot timer 118 in chipset 114, i.e., the time-slot control information is provided by software that executes in electronic device 100.

At a given time, this time-slot control information gates the release of a data packet from one of hardware queues 116. In some embodiments, the timing signal provided by optional slot timer 112 or optional slot timer 118 writes a value to hardware port 120, which performs the gating after an associated delay of approximately 1 μs.

Moreover, a frame-assembly mechanism 122 (such as an IEEE 802.11 distributed coordination function) adds headers to the IEEE 802.11 frame (which are associated with the data packet). Subsequently, transmitter 124 transmits the resulting IEEE 802.11 frame in a time slot on the communication channel using TDMA.

Figure 2:
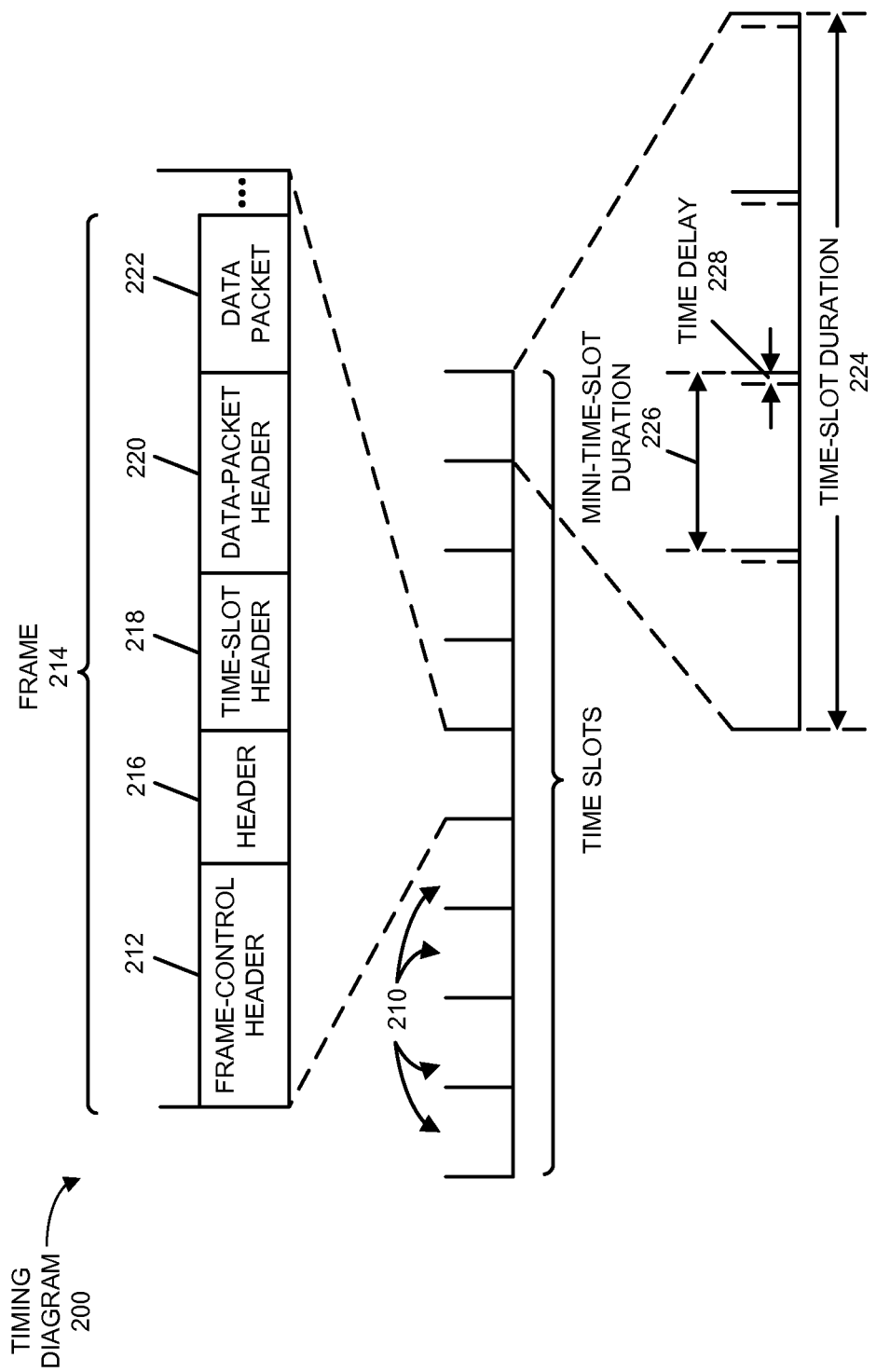
FIG. 2 is a timing diagram that includes an IEEE 802.11 frame transmitted by the IEEE 802.11-compliant chipset of FIG. 1 in accordance with an embodiment of the present disclosure.

FIG. 2 presents a timing diagram 200 that includes an IEEE 802.11 frame 214 transmitted by IEEE 802.11-compliant chipset 114 (FIG. 1). In particular, this timing diagram illustrates the temporal division of the communication channel into a sequence of time slots 210. A given time slot may include one transport unit, including: an IEEE 802.11 frame control header 212 (such as IEEE 802.11-2007 Standard Sec 7.1.3.1), a two to ten byte header 216 that identifies frame 214 (and which may include timing-synchronization information that mutually synchronizes various terminals or nodes in a network), a non-IEEE 802.11 TDMA time-slot header 218, a non-IEEE 802.11 TDMA data-packet header 220 and/or one or more data packets, such as data packet 222. Alternatively, in some embodiments the given time slot includes multiple frames (such as when the data packets are associated with an Internet-protocol-suite or TCP/IP data stream). Note that header 212 may designate the payload (i.e., frame 214) as a reserved management frame type so that it is compatible with the IEEE 802.11-communication protocol and can contain TDMA information that is not modified by hardware in chipset 114 (FIG. 1).

Furthermore, time-slot header 218 may include: timing-synchronization information (if in-band time synchronization is used), a transmitter node identifier, a number of data packets and/or control information (such as reservations, network topology, a checksum, etc.). Additionally, data-packet header 220 may include: a receiver node identifier, a byte length, a checksum, etc.). This information may facilitate: CSMA, subsequent reservations by nodes (such as electronic device 100 in FIG. 1) and TDMA communication. Note that the reservations may determine which node gets which time slot and frame, and which data packet(s) are in that time slot.

As noted previously, data packets may be assigned to time slots 210 using a packet scheduler that maps software queues 110 (FIG. 1) to hardware queues 116 (FIG. 1). For example, the packet scheduler may use techniques such as weighted-fair queuing or priority queuing to fit the data packets in hardware queues 116 (FIG. 1) into the bounded time of time slots 210. However, if an entire time slot is assigned to a single node, it may be difficult to get the correct timing by gating hardware queues 116 (FIG. 1). In order to reduce the impact of missed timing on the utilization (or efficiency) of the communication channel, in some embodiments time-slot duration 224 of a given time slot is sub-divided into mini time slots having mini time-slot duration 226, which may be assigned to one or more receiving nodes. For example, a 1000 µs time slot, may include four 250 is mini time slots, which are each separated by a guard interval or time delay 228 (such as a 1 µs delay). In embodiments with mini time slots, a mini time-slot scheduler may be used to assign data packets from hardware queues 116 (FIG. 1) to these mini time slots, such as a strict-priority scheduler (which may use a counter in hardware queues 116 or in software) and/or a weighted-fair queuing scheduler.

Note that the use of mini time slots may cause a slightly poorer overall average utilization of the communication channel. Thus, in general, the number of software queues and the number of hardware queues may be selected based on a timing error associated with the gating and the utilization of the communication channel.

The functionality in electronic device 100 (FIG. 1) that configures and controls chipset 114 (FIG. 1) may be implemented in dedicated hardware and/or in software, such as instructions that are executed by a processor, so long as the underlying IEEE 802.11 hardware (i.e., chipset 114) supports gated transmit hardware queues and has a low-latency hardware queue enable via a register setting. For example, electronic device 100 may include an embedded RISC processor and/or a software solution, such as a real-time Linux operating system (e.g., real time application interface).

Figure 3:
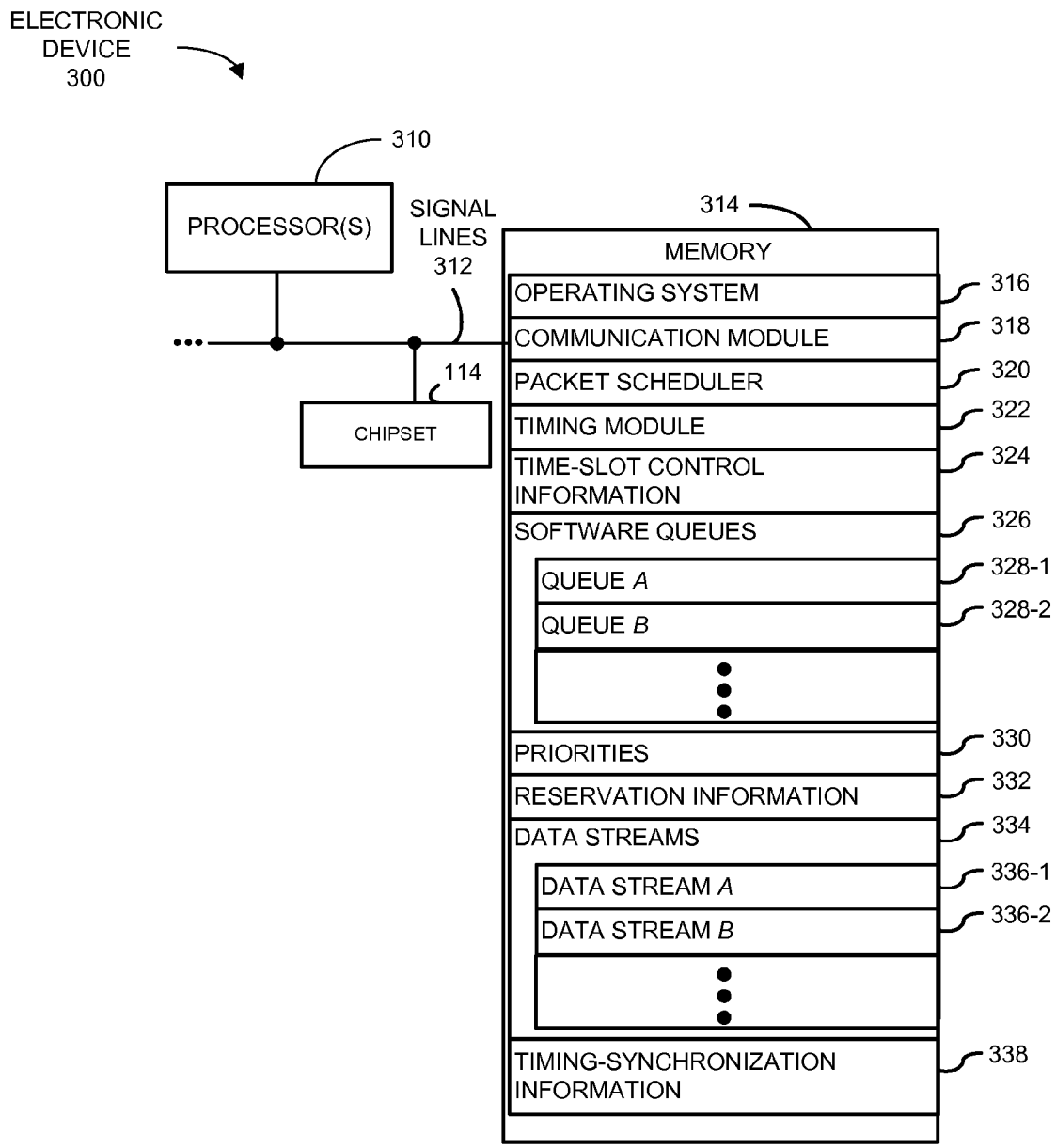
FIG. 3 is a block diagram of an electronic device that includes the IEEE 802.11-compliant chipset in accordance with an embodiment of the present disclosure.

This is shown in FIG. 3, which presents a block diagram of an electronic device 300 that includes IEEE 802.11-compliant chipset 114. Electronic device 300 includes: one or more processors 310 (or processing units), chipset 114, memory 314 and one or more signal lines 312 coupling these components together. Note that the one or more processing units 310 may support parallel processing and/or multi-threaded operation.

Furthermore, memory 314 may include volatile memory and/or non-volatile memory. More specifically, memory 314 may include: ROM, RAM, EPROM, EEPROM, flash, one or more smart cards, one or more magnetic disc storage devices, and/or one or more optical storage devices. Memory 314 may store an operating system 316 that includes procedures (or a set of instructions) for handling various basic system services for performing hardware-dependent tasks. In some embodiments, the operating system 316 is a real-time operating system. Memory 314 may also store communication procedures (or a set of instructions) in a communication module 318. These communication procedures may be used for communicating with one or more electronic devices (or nodes) that are remotely located with respect to electronic device 300 in the network.

Memory 314 may also include multiple program modules (or sets of instructions), including: packet scheduler 320 (or a set of instructions) and/or timing module 322 (or a set of instructions). Note that one or more of these program modules may constitute a computer-program mechanism or a software driver for chipset 114.

During operation, data packets are queued in software queues 326, such as software queue A 328-1 and software queue B 328-2. Then, data packets are provided to hardware queues in chipset 114 based on available space in the hardware queues for subsequent inclusion in IEEE 802.11 frames that are compliant with an IEEE 802.11 communication protocol. In particular, packet scheduler 320 may determine the mapping of software queues 326 to the hardware queues, which may correspond to time slots and/or mini time slots in the IEEE 802.11 frames.

Then, timing module 322 provides time-slot control information 324 to chipset 314 based on a timing-synchronization signal that is derived from timing-synchronization information 338. This time-slot control information may be used to gate the release of data packets from the hardware queues for transmission in the IEEE 802.11 frame in a communication channel by chipset 114 using TDMA.

Note that time-slot control information 324 may be generated in hardware (such as a slot timer) in either electronic device 300 or chipset 114. Thus, time-slot control information 324 may include a timing signal or a count value. Furthermore, timing-synchronization information 338 may include mutual-synchronization information that is shared between electronic devices (or nodes) in the network and/or may be provided by an external source. This timing-synchronization information may be communicated to or among the electronic devices using in-band and/or out-of-band communication.

In some embodiments, assignment of data packets from software queues 326 and/or hardware queues is also based on data-packet priorities 330 and/or an associated one of data streams 334, such as data stream A 336-1 or data stream B 336-2.

Furthermore, in some embodiments electronic device 300 provides reservation information 332 (such as currently reserved time slots and/or mini time slots, as well as future reservation requests by the electronic devices in the network) to chipset 114 for inclusion in the IEEE 802.11 frames.

In an exemplary embodiment, TDMA communication over IEEE 802.11a or 802.11n is implemented in the physical layer using IEEE 802.11-compatible chipset features, such as those in a chipset from Atheros Communication, Inc. of Santa Clara, Calif. In particular, a custom packet is embedded inside of an IEEE 802.11 physical layer convergence protocol (PLCP) header using a reserved IEEE 802.11 frame type, and slotting and queuing features may be configured to increase performance. As a consequence, to all non-TDMA nodes in the network, it will appear that the communication channel is occupied by standards-compliant frames of an unknown type.

In the Atheros chipset, all of the queues may be initialized in CBR-scheduled mode with OneShot enabled. As a consequence, each of the ten hardware queues (Q0-Q9) is blocked and will queue data packets until both of the following conditions are true: the CBR timer expires; and the OneShotArm is set true via a register setting. Note that, because the hardware queues are run in OneShot mode, the CBR timer may be run at a very short interval (e.g., 5 µs) such that there is minimum latency between OneShotArm and the beginning of data-packet transmission.

Once a hardware queue is enabled via the above two conditions, it will continue sending data packets in priority order until the queue ReadyTime expires or until a Virtual End-Of-List (VEOL) is detected. In order to ensure that each setting of OneShotArm for the hardware queue transmits exactly one data packet, VEOL may be set on every data packet queued. Therefore, ReadyTime may be set to a large value, such as time-slot duration 224 (FIG. 2).

Because scheduling is performed using TDMA headers, contention-avoidance features in the Atheros chipset may be disabled, for example, by setting minimum values for parameters such as AIFS and CWmin, CWmax. In addition, backoff after transmit and virtual collisions may be disabled. This may allow the electronic device to contend for the communication channel after zero backoff time slots without increasing the contention window.

As described previously in the context of FIG. 2, a guard interval or time delay 228 may be included at the end of each time slot or mini time slot. For example, at 54 Mbps, time-slot length or duration 224 may be 400 μs (which corresponds to 2500 time slots per second). These time slots may each have a 10 μs guard band. Note that, in the remaining 390 μs, a single data packet of 2562 bytes may be transmitted. Furthermore, note that at 54 Mbps time-slot duration 224 may be 400 μs and mini time-slot duration 226 may be 65 μs.

Figure 4:
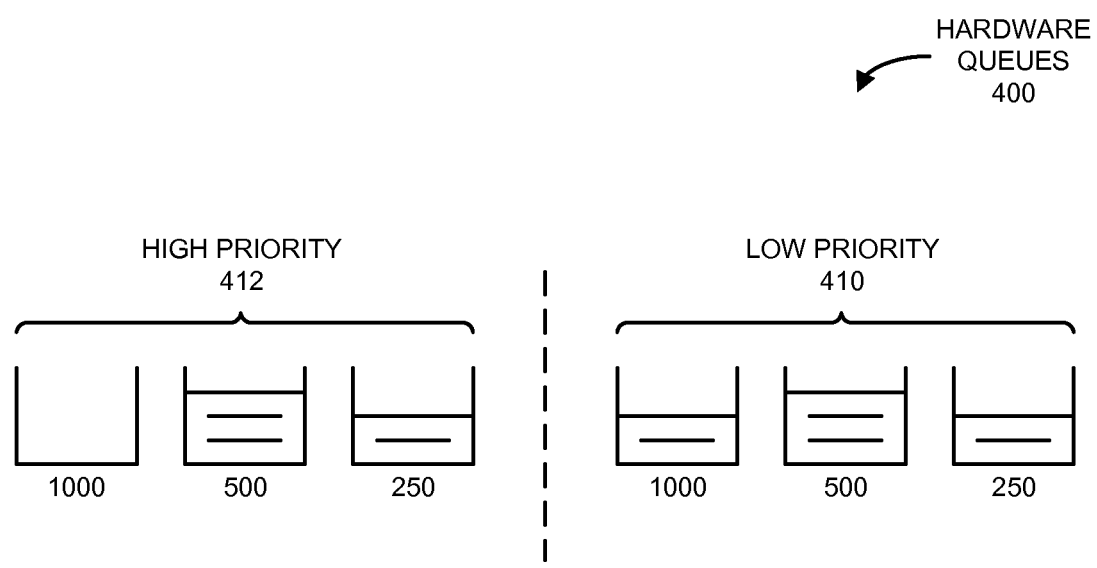
FIG. 4 is a block diagram of hardware queues in the IEEE 802.11-compliant chipset in accordance with an embodiment of the present disclosure.

In some embodiments, multiple hardware queues may be used for: different data-packet sizes (or different data-packet transmission times) and/or different data-packet priorities, which may allow the total air time for each time slot (or mini time slot) to be bounded. This is shown in FIG. 4, which presents a block diagram of hardware queues 400 in the IEEE 802.11-compliant chipset. In particular, there are different classes of time-bound hardware queues 400, including bounded data-packet transmission times of 250, 500 and 1000 μs for low priority 410 and high priority 412 data streams (for example, web-page or file-transfer data streams versus voice, video or network-control data streams). In some embodiments there are a total of ten hardware queues, and 'high,' 'medium' and 'low' data-packet priorities may be spread over these hardware queues in distinct subsets. For example, Q0 may include VoIP data packets having a size of 128 bytes or less, Q1 may include video data packets (such as those associated with a high-definition video stream) having a size of 1500 bytes or less, etc. Note that, by reducing the number of combinations to a small, manageable set of hardware queues, there may be a good tradeoff between granularity (which reduces the impact of missed timing on utilization) and the overall average utilization. Also note that the data-packet priority can be based on the overall latency, thereby determining the order in which the data packets go into the hardware queues.

Thus, in some embodiments it may be desirable to send data packets having lengths up to 128 bytes, 512 bytes or 1500 bytes. These different data-packet sizes may be associated with different hardware queues. If it is assumed that each data packet is separated by a minimum time interval (25 μs for IEEE 802.11a), then: Q2 may include data packets having a size of 128 bytes or less (65 μs at 54 Mbps); Q3 may include data packets having a size of 512 bytes or less (125 μs at 54 Mbps); and Q4 may include data packets having a size of 1500 bytes or less (269 μs at 54 Mbps). Therefore, any combination with $$65a + 125b + 269c \leq 390,$$

(for non-negative values of a, b and c) may be transmitted in a given time slot. Table 1 provides possible data-packet combinations in the given time slot.

TABLE 1

| 128 Bytes | 512 Bytes | 1500 Bytes |
| --- | --- | --- |
| 6 | — | — |
| 4 | 1 | — |
| 2 | 2 | — |
| — | 3 | — |
| 2 | — | 1 |
| — | 1 | 1 |

Note that the first-in, first-out order of a data stream may be maintained by detecting an ordered data steam and using a single large hardware queue for such a data stream. For example, if a TCP/IP data stream is detected, all of the data packets may be placed in a 1500-byte hardware queue, regardless of their size (or data-packet transmission times for a given data rate), because this hardware queue can accommodate the data packet with the largest data-packet transmission time in this data stream.

A variety of techniques may be used to ensure time synchronization among electronic devices that communicate via the communication channel using TDMA. As noted previously, in some embodiments the electronic device communicates timing-synchronization information associated with the timing-synchronization signal to another IEEE 802.11-compliant chipset in a communication system using in-band communication in the communication channel (i.e., mutual synchronization). For example, the timing-synchronization information may be provided to chipset 114 (FIGS. 1 and 3) for inclusion in a header field in the IEEE 802.11 frame that includes the data packet. In this way, the time-slot synchronization information may facilitate common timing of the communication channel using TDMA. However, in other embodiments, the electronic devices may receive the timing-synchronization signal from an external source using out-of-band communication. For example, the timing-synchronization signal may be associated with a positioning system, such as the Global Positioning System.

In some embodiments, the IEEE 802.11 timing synchronization function is modified to provide time synchronization. For example, if the network includes a home media center that distributes content to a small number of displays (such as fewer than 10 devices within 2-3 hops), time may be centrally distributed from the media center using the IEEE 802.11 timing synchronization function. Otherwise, a mutual-synchronization technique may be used.

Figure 5:
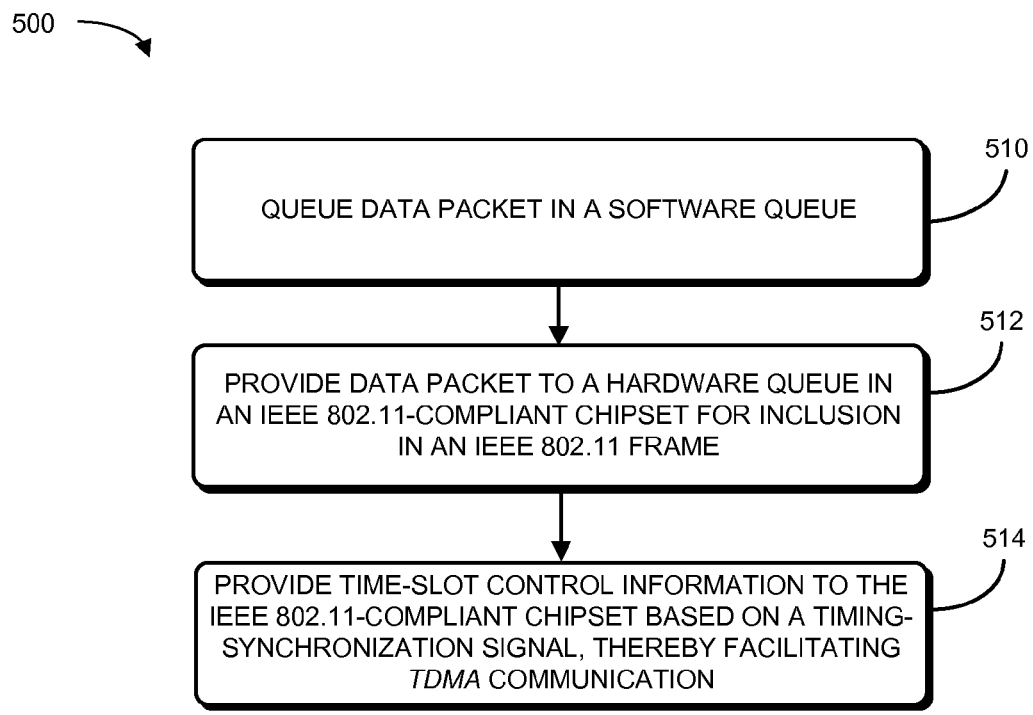
FIG. 5 is flow chart illustrating a method for communicating information using the electronic device of FIG. 1 or 3 in accordance with an embodiment of the present disclosure.

We now describe an embodiment of the method. FIG. 5 presents a flow chart illustrating a method 500 for communicating information using electronic devices 100 (FIG. 1) and/or 300 (FIG. 3). During operation, the electronic device queues a data packet in a software queue (operation 510). Then, the electronic device provides the data packet to a hardware queue in the IEEE 802.11-compliant chipset for inclusion in an IEEE 802.11 frame (operation 512). Note that the data packet is provided based on available space in the hardware queue, and that the IEEE 802.11 frame is compliant with an IEEE 802.11 communication protocol. Next, the electronic device provides time-slot control information to the IEEE 802.11-compliant chipset based on a timing-synchronization signal (operation 514), thereby gating the release of the data packet from the hardware queue for transmission in the IEEE 802.11 frame in a communication channel by the IEEE 802.11-compliant chipset using TDMA.

In some embodiments of method 500, there may be additional or fewer operations. Moreover, the order of the operations may be changed, and/or two or more operations may be combined into a single operation.

Furthermore, in some embodiments electronic devices 100 (FIG. 1) and/or 300 (FIG. 3) include fewer or additional components. For example, in FIG. 1 chipset 114 is included in electronic device 100, but in other embodiments it may be external to electronic device 100. Moreover, two or more components may be combined into a single component and/or a position of one or more components may be changed. Furthermore, the functionality of these electronic devices may be implemented more in hardware and less in software, or less in hardware and more in software, as is known in the art. In some embodiments, some or all of the functionality of electronic devices 100 (FIG. 1) and/or 300 (FIG. 3) may be implemented in one or more application-specific integrated circuits (ASICs) and/or one or more digital signal processors (DSPs).

In FIG. 3, instructions in the various modules in memory 314 may be implemented in: a high-level procedural language, an object-oriented programming language, and/or in an assembly or machine language. This programming language may be compiled or interpreted, i.e., configurable or configured, to be executed by the one or more processing units or processors 310.

Note that electronic devices 100 (FIG. 1) and/or 300 may include one of a variety of devices capable of manipulating computer-readable data or communicating such data between two or more electronic devices (or nodes) over a network, including: a computer terminal, a desktop computer, a laptop computer, a network node or terminal, a server, a mainframe computer, a kiosk, a portable electronic device (such as a cellular phone or PDA), a server and/or a client computer (in a client-server architecture). Moreover, the communication channel may include: the Internet, World Wide Web (WWW), an intranet, a wired network, an optical network, a wireless network, LAN, WAN, MAN, or a combination of networks, or other technology enabling communication between electronic devices.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for communicating information, comprising:
   queuing a data packet in a software queue;
   providing the data packet to a hardware queue in an IEEE 802.11-compliant chipset for inclusion in an IEEE 802.11 frame, wherein the data packet is provided based on available space in the hardware queue, and wherein the IEEE 802.11 frame is compliant with an IEEE 802.11 communication protocol;
   providing time-slot control information to the IEEE 802.11-compliant chipset based on a timing-synchronization signal, thereby gating the release of the data packet from the hardware queue for transmission in the IEEE 802.11 frame in a communication channel by the IEEE 802.11-compliant chipset using time division multiple access (TDMA); and
   communicating timing-synchronization information associated with the timing-synchronization signal to another IEEE 802.11-compliant chipset in a communication system using in-band communication in the communication channel;
   wherein the timing-synchronization information is provided to the IEEE 802.11-compliant chipset for inclusion in a standard header field in the IEEE 802.11 frame that includes the data packet; and
   wherein the time-slot synchronization information facilitates common timing of the communication channel using TDMA.

2. The method of claim 1, wherein the time-slot control information includes a count value for a timer in the IEEE 802.11-compliant chipset.

3. The method of claim 1, wherein the time-slot control information includes a timing signal generated by a timer in software.

4. The method of claim 1, wherein the method further includes disabling a contention-avoidance feature in the IEEE 802.11-compliant chipset.

5. The method of claim 1, wherein the method further includes configuring the IEEE 802.11-compliant chipset to release one data packet at a time from the hardware queue.

6. The method of claim 1, wherein gating the hardware queue involves writing a value to a hardware port in the IEEE 802.11-compliant chipset.

7. The method of claim 1, wherein the method further includes receiving the timing-synchronization signal from an external source using out-of-band communication.

8. The method of claim 1, wherein providing the data packet to the hardware queue involves an asynchronous operation.

9. The method of claim 1, wherein the method further comprises:
   queuing multiple data packets in multiple software queues;
   mapping software queues to hardware queues;
   providing the data packets to the hardware queues in the IEEE 802.11-compliant chipset for inclusion in IEEE 802.11 frames, wherein the data packets are provided based on available space in the hardware queues, and wherein the IEEE 802.11 frames are compliant with the IEEE 802.11 communication protocol; and
   providing additional time-slot control information to the IEEE 802.11-compliant chipset based on the timing-synchronization signal to gate the release of the data packets from the hardware queues for transmission by the IEEE 802.11-compliant chipset in the communication channel using TDMA.

10. The method of claim 9, wherein a subset of the data packets are included in a given IEEE 802.11 frame.

11. The method of claim 9, wherein a given time slot includes multiple mini time slots that include an associated subset of the data packets.

12. The method of claim 9, wherein the number of software queues and the number of hardware queues are selected based on a timing error associated with the gating and utilization of the communication channel.

13. The method of claim 9, wherein the hardware queues are associated with different communication priorities.

14. The method of claim 9, wherein a given hardware queue is associated with a given data-packet transmission time of a subset of the data packets for a given data rate in the communication channel, thereby facilitating inclusion of the data packets within a bounded time duration of assigned time slots.

15. The method of claim 9, wherein a sequence of data packets in a data stream, which have different data-packet transmission times, are assigned to one of the hardware queues that can accommodate a largest data-packet transmission time in the different data-packet transmission times.

16. The method of claim 9, wherein the data packets are provided from the software queues to the hardware queues based on a packet scheduler.

17. A non-transitory computer-program product for use in conjunction with an IEEE 802.11-compliant chipset, the computer-program product comprising a computer-readable storage medium and a computer-program mechanism embedded therein to communicate information, the computer-program mechanism including:
- instructions for queuing a data packet in a software queue;
- instructions for providing the data packet to a hardware queue in an IEEE 802.11-compliant chipset for inclusion in an IEEE 802.11 frame, wherein the data packet is provided based on available space in the hardware queue, and wherein the IEEE 802.11 frame is compliant with an IEEE 802.11 communication protocol;
- instructions for providing time-slot control information to the IEEE 802.11-compliant chipset based on a timing-synchronization signal, thereby gating the release of the data packet from the hardware queue for transmission in the IEEE 802.11 frame in a communication channel by the IEEE 802.11-compliant chipset using TDMA; and
- instructions for communicating timing-synchronization information associated with the timing-synchronization signal to another IEEE 802.11-compliant chipset in a communication system using in-band communication in the communication channel;
- wherein the timing-synchronization information is provided to the IEEE 802.11-compliant chipset for inclusion in a standard header field in the IEEE 802.11 frame that includes the data packet; and
- wherein the time-slot synchronization information facilitates common timing of the communication channel using TDMA.

18. An electronic device, comprising:
an IEEE 802.11-compliant chipset that includes:
- a hardware queue;
- a frame-assembly mechanism coupled to the hardware queue; and
- a transmitter coupled to the frame-assembly mechanism;

a processor;
memory; and
a program module, wherein the program module is stored in the memory and configured to be executed by the processor, the program module to communicate information, the program module including:
- instructions for queuing a data packet in a software queue;
- instructions for providing the data packet to the hardware queue in the IEEE 802.11-compliant chipset for inclusion in an IEEE 802.11 frame, wherein the data packet is provided based on available space in the hardware queue, and wherein the IEEE 802.11 frame is compliant with an IEEE 802.11 communication protocol;
- instructions for providing time-slot control information to the IEEE 802.11-compliant chipset based on a timing-synchronization signal, thereby gating the release of the data packet from the hardware queue for transmission in the IEEE 802.11 frame in a communication channel by the IEEE 802.11-compliant chipset using TDMA; and
- instructions for communicating timing-synchronization information associated with the timing-synchronization signal to another IEEE 802.11-compliant chipset in a communication system using in-band communication in the communication channel;

wherein the timing-synchronization information is provided to the IEEE 802.11-compliant chipset for inclusion in a standard header field in the IEEE 802.11 frame that includes the data packet; and
wherein the time-slot synchronization information facilitates common timing of the communication channel using TDMA.

* * * * *